(No Model.)
S. H. FLAGG.
CONDUIT FOR ELECTRIC WIRES.
No. 480,573. Patented Aug. 9, 1892.
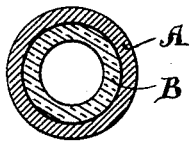
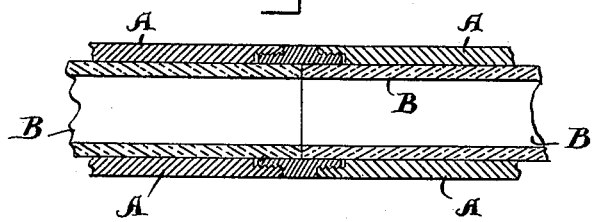
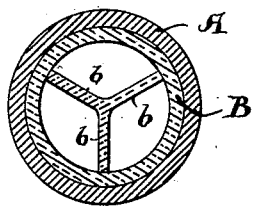
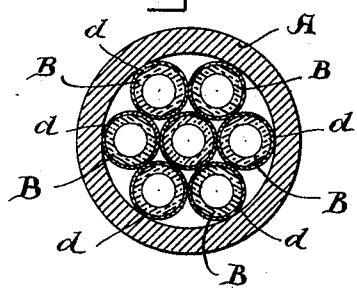
Witnesses.
J. George Seltzer
Lauritz W. Mohler
Inventor.
Samuel H. Flagg
by Edwin Blanka
attorney.

UNITED STATES PATENT OFFICE.

SAMUEL H. FLAGG, OF PROVIDENCE, RHODE ISLAND.

CONDUIT FOR ELECTRIC WIRES.

SPECIFICATION forming part of Letters Patent No. 480,573, dated August 9, 1892.

Application filed January 26, 1889. Serial No. 297,683. (No model.)

*To all whom it may concern:*

Be it known that I, SAMUEL H. FLAGG, a citizen of the United States, residing at Providence, in the county of Providence and State of Rhode Island, have invented certain new and useful Improvements in Conduits for Electric Wires, of which the following is a specification.

The object of my invention is to produce a pipe suitable for a conduit for electric or telegraph wires; and the invention consists in placing one or more glass pipes or tubes within a pipe or tube of metal, all as hereinafter fully described, and pointed out in the claims.

Referring to the accompanying drawings, Figure 1 represents a cross-section of a pipe embodying my invention. Fig. 2 is a longitudinal section through the same, showing the connection of two pipes. Fig. 3 is a cross-section of the pipe, showing it divided by longitudinal partitions. Fig. 4 is a cross-section with a nest of glass tubes.

A represents a pipe or tube, preferably of cast-iron, and B is a pipe or tube of glass made of such a size as to just fit the metal pipe A and through which the electric wire is passed. I couple the pipes together in the manner shown in Fig. 2—that is to say, by means of a coupling the internal diameter of which is exactly the same as that of the pipes A and the outside central portion the same diameter as the outside diameter of said pipes, the ends being cut down about one-half their thickness and screw-threaded and the ends of the pipes A being formed and screw-threaded to fit on the ends of the coupling, in which case the glass pipes or tubes being slightly longer than the metal tube, so that when the latter are connected together the ends of the glass pipes or tubes will meet each other, and, if desired, they may be connected together by any suitable cement placed on their ends before being drawn together.

In Fig. 3 I have shown the interior of the glass pipe or tube divided into three compartments by longititudinal partitions *b* of glass or other suitable insulating material. Of course the number and arrangement of the partitions would have to be modified according to the number of wires to be carried by the tube.

In Fig. 4 I have shown a number of glass pipes or tubes B contained within a metal tube A, so that the wires running through said tube will all be insulated from each other, and in order to prevent the liability of the tubes being broken by any jar I prefer to place a packing *d*, of any suitable material, around them.

What I claim as my invention is—

1. A conduit for electric wires, consisting of a metal pipe A and a glass pipe B of a diameter to exactly fit said metal pipe and somewhat longer than said pipe in combination with a coupling the interior portion of which forms a continuation of the pipe A, substantially as set forth.

2. A conduit for electric wires, consisting of a metal pipe A and a glass tube B of a size to exactly fit the metal pipe and having partitions *b*, whereby the glass tube is divided into three or more compartments, substantially as shown and described.

In testimony whereof I have signed my name to this specification in the presence of two subscribing witnesses.

SAMUEL H. FLAGG.

Witnesses:
L. W. HOWES,
EDWIN PLANTA.